(12) United States Patent
Rulkens et al.

(10) Patent No.: US 9,080,029 B2
(45) Date of Patent: Jul. 14, 2015

(54) E/E CONNECTOR AND POLYMER COMPOSITION USED THEREIN

(75) Inventors: Rudy Rulkens, Margraten (NL);
Wilfred W. G. J. Van Pelt, Waalre (NL);
Kang-Tse Hsu, Gaoyuan Village (TW);
Peter R. Dufour, The Hague (NL);
Hiromi Iribe, Chiba (JP)

(73) Assignee: DSM IP ASSETS B.V., Heerlen (NL)

( * ) Notice: Subject to any disclaimer, the term of this patent is extended or adjusted under 35 U.S.C. 154(b) by 779 days.

(21) Appl. No.: 12/670,227

(22) PCT Filed: Jul. 17, 2008

(86) PCT No.: PCT/EP2008/005872
§ 371 (c)(1),
(2), (4) Date: Jun. 29, 2010

(87) PCT Pub. No.: WO2009/012936
PCT Pub. Date: Jan. 29, 2009

(65) Prior Publication Data
US 2010/0279550 A1 Nov. 4, 2010

(30) Foreign Application Priority Data

Jul. 23, 2007 (EP) .................................... 07014395

(51) Int. Cl.
| | |
|---|---|
| C08G 73/10 | (2006.01) |
| C08G 69/08 | (2006.01) |
| C08L 77/00 | (2006.01) |
| C08K 3/00 | (2006.01) |
| C08G 69/26 | (2006.01) |
| C08L 77/06 | (2006.01) |
| H01R 13/527 | (2006.01) |
| C08K 3/38 | (2006.01) |
| C08K 7/14 | (2006.01) |
| C08L 25/18 | (2006.01) |

(52) U.S. Cl.
CPC ............ *C08K 3/0058* (2013.01); *C08G 69/265* (2013.01); *C08K 3/0033* (2013.01); *C08L 77/06* (2013.01); *H01R 13/527* (2013.01); *C08K 3/38* (2013.01); *C08K 7/14* (2013.01); *C08L 25/18* (2013.01)

(58) Field of Classification Search
CPC ........ C08G 69/26; C08G 69/256; C08K 7/00; C08K 7/02; C08K 5/005; C08K 5/0066; C08K 3/0041; C08K 3/0058; C08K 3/0033; C08L 77/06; C08L 2203/20; C08L 2203/206; H01B 3/30; H01B 3/305
USPC .......... 524/879; 528/310, 324, 340, 338, 339; 525/432, 420
See application file for complete search history.

(56) References Cited

U.S. PATENT DOCUMENTS

| | | | |
|---|---|---|---|
| 5,849,826 A | 12/1998 | Ogo et al. | |
| 6,747,120 B2 * | 6/2004 | Rulkens et al. | ............... 528/310 |
| 6,780,963 B2 | 8/2004 | Sawada et al. | |
| 2007/0267607 A1 * | 11/2007 | Ohkawa | ........................ 252/601 |

FOREIGN PATENT DOCUMENTS

| | | | |
|---|---|---|---|
| EP | 0 449 466 | 10/1991 | |
| JP | 61-31217 | 2/1986 | |
| WO | WO 2005/073320 A1 * | 8/2005 | ............. C08L 77/06 |
| WO | 2007/085406 | 8/2007 | |
| WO | WO 2007/085406 A1 * | 8/2007 | ............. C08G 69/30 |

OTHER PUBLICATIONS

International Search Report for PCT/EP2008/005872, mailed Sep. 11, 2008.
Database HCAPLUS [online], Chemical Abstracts Service, Columbus, Ohio, US; Feb. 13, 1986, Chiba, Kazumasa Chiba, Kazumasa: "Poly(tetramethyleneadipamide) Injection Moldings Poly(tetramethyleneadipamide Injection Moldings", XP002453132.
Database WPI Week 198613 Thomson Scientific, London, GB; 1986-084826, Feb. 13, 1986, XP002453140.
International Preliminary Report on Patentability dated Jan. 26, 2010.
Malluche et al; *The condensation Kinetics of Polyphthalamides. I. Diamines and Diacids or Dimethylesters*, Polymer Engineering and Science, pp. 1589-1599 (2007).

* cited by examiner

*Primary Examiner* — Jane L Stanley
(74) *Attorney, Agent, or Firm* — Nixon & Vanderhye P.C.

(57) ABSTRACT

This invention relates to a flame retardant polyamide composition comprising a semi-aromatic polyamide, a flame retardant system and a reinforcing agent, wherein the semi-aromatic polyamide comprises units derived from dicarboxylic acids comprising terephthalic acid and aliphatic dicarboxylic acids, and aliphatic diamines. In the semi-aromatic polyamide the aliphatic diamines consist of 10-70 mole % of a short chain aliphatic diamine with 2-5 C atoms and 30-90 mole % of a long chain aliphatic diamine with at least 6 C atoms; the dicarboxylic acids consist of 5-65 mole % aliphatic dicarboxylic acid and optionally aromatic dicarboxylic acid other than terephthalic acid and 35-95 mole % terephthalic acid; and the combined molar amount of terephthalic acid and the long chain aliphatic diamine is at least 60 mole %, relative to the total molar amount of the dicarboxylic acids and diamines. The invention also relates to a housing for an electrical/electronic (E/E) connector and use therein of the flame retardant polyamide composition, to a surface mounting process wherein the E/E connector is used and to a surface mounted device comprising the E/E connector.

5 Claims, No Drawings

E/E CONNECTOR AND POLYMER COMPOSITION USED THEREIN

This application is the U.S. national phase of International Application No. PCT/EP2008/005872, filed 17 Jul. 2008, which designated the U.S. and claims priority to European Application No. 07014395,3, filed 23 Jul. 2007, the entire contents of each of which are hereby incorporated by reference.

The present invention relates to an electrical/electronic (E/E) connector and use therein of non-flame retardant and flame retardant polyamide compositions. This invention also relates to a surface mounting process wherein the E/E connector is used and to a surface mounted device comprising the E/E connector. The present invention further relates to a flame retardant polyamide composition comprising a semi-aromatic polyamide, a flame retardant system and a reinforcing agent, wherein the semi-aromatic polyamide comprises units derived from dicarboxylic acids comprising terephthalic acid and aliphatic dicarboxylic acids, and aliphatic diamines, which can be used in the connectors.

An electrical connector is a conductive device for joining electrical circuits together. For example terminal blocks mounted on a printed circuit board (PCB) allow individual wires to be connected to the circuit board. The connection may be temporary, as for portable equipment, or may require a tool for assembly and removal, or may be a permanent electrical joint between two wires or devices. Typically, such an electrical connector comprises an electrically conductive element, or two or more conductive elements enveloped by a housing made of an electrically insulating material, such as a plastic material. The plastic material may be a polymer composition comprising different components, and the housings may be made by injection moulding processes. Polymer compositions used in injection moulded parts for electrical and electronic applications have to comply with many requirements, generally including flame retardancy as a basic requirement. For many of these applications, the presence of a flame retardant is essential to passing UL-94 V-0 flammability rating, in order to obtain UL qualification as electrical and electronic components. Next to that there are also connector applications where flame retardancy requirements are less stringent, and a flame retardant is not always necessary, e.g. where a UL-HB rating is sufficient. Mechanical properties are also becoming more critical due to downsizing of connectors, for example in respect of peel-off strength on PCBs, high pre-loads on contacts, and heavy environmental testing, which requires a high humidity thermal shock resistance. Furthermore, often the injection moulded parts are rather complex and dimensional stability thereof under end-use conditions becomes a critical attribute of performance. This is especially true for electrical/electronic (E/E) connector applications where the cross-section of parts is rather thin and where the same parts can be relatively long. For electronic connectors, component integrity and retention of pin position requires excellent dimensional stability under the high temperatures encountered during the soldering process. In many instances, when electronic connectors are soldered to circuit boards using surface mounting techniques (SMT) high surface temperatures encountered with these processes result in blistering of the plastic connector. Due to the ban of lead, the soldering temperatures increased for wave and reflow soldering. Blistering is the manifestation of expansion of voids, trapped moisture, or gas, under soldering process conditions. As the trend to high temperature lead-free soldering progresses, the use of conventional polyamide compositions in combination with current connector handling procedures will not be sufficient to prevent blistering. The key parameter in controlling and thus preventing blistering of E/E connector housings has been the control of moisture absorption in the molded parts. Blistering occurs upon super-saturation of the housing resin with water vapor. Much of the SMT assembly for PCBs is done in the Pacific Rim region of the world. The high temperature and humidity levels to which connectors can be exposed can result in saturation of these connectors with water.

The blister onset temperature is dependent upon a number of factors that include, percentage of moisture in the part, the speed of connector heating, and the peak temperature of the reflow process, crystallinity and moulding conditions (e.g. mould temperature, melt temperature), storage conditions (e.g. temperature, % RH, duration) and part design characteristics (i.e. thickness, length). Moulded parts are often stored under humid conditions to reduce the propensity of blistering during the soldering process.

The higher the peak temperature, the lower the allowable moisture content before blister occurs. Lead-free solders require higher peak temperatures and therefore the incidence of blistering will be greater.

Polyamide resin compositions have historically found limited use in electronic/electrical applications because of their moisture absorption characteristics, which can adversely affect their dimensional stability and their resistance to blistering under soldering conditions.

Examples of polyamides that are used in connectors are, for example, polyamide-46 and semi-aromatic copolyamides. Semi-aromatic copolyamides based on terephthalic acid (TA) and hexamethylene diamine (HMD), optionally including adipic acid as aliphatic dicarboxylic acid, are generically described in the patent literature. High temperature, semi-crystalline, semi-aromatic nylon copolymers made from TA and aliphatic diamine, as well as copolymers made from TA, aliphatic dicarboxylic acid and aliphatic diamine are known from U.S. Pat. No. 6,140,459. The copolymers of U.S. Pat. No. 6,140,459 are based on TA, aliphatic dicarboxylic acid having 9-12 carbon atoms and HMD as the aliphatic diamine.

As stated in U.S. Pat. No. 6,140,459 many copolymers based on TA and HMD described in the patent literature or in commercial existence give very marginal performance in surface mounting applications. Such is the case for 6T/DT [50/50 molar ratio], the copolymer of hexamethylene terephthalamide (6T) and 2-methyl pentamethylene terephthalamide (DT) (U.S. Pat. No. 5,378,800 to Mok, Pagilagan; U.S. Pat. No. 5,322,923 to Lahary, Coquard) because of its high glass transition temperature (Tg) and high post-moulding shrinkage. A terpolymer of hexamethylene terephthalamide/hexamethylene isophthalamide/hexamethylene adipamide (6T/61/66) [65/25/10 molar ratio], based on 3 acids (terephthalic acid (TA), isophthalic acid (IA) and adipic acid (AA)), and HMD (U.S. Pat. No. Re. 34,447 to Poppe, Lisle, et al.) has high mould and post moulding shrinkage when moulded in cold moulds. Similar would be the situation for the hexamethylene terephthalamide/hexamethylene isophthalamide/hexamethylene sebacamide (6T/61/610) terpolymer [70/20/10 molar ratio] (U.S. Pat. No. 5,424,104 to Amimoto et al.) because of its high Tg. Such would also be the case of the copolymer of hexamethyleneterephthalamide/caprolactam (6T/6) [70/30] (EP 413258, to Kopietz, Betz, Blinne, Koch) because of its high Tg. Copolymers of hexamethylene terephthalamide/hexamethylene adipamide (6T/66), based on TA, AA and HMD, at 55/45 molar ratio (U.S. Pat. No. 5,424,104) or 65/35 molar ratio (U.S. Pat. No. Re. 34,447) display acceptable post mould shrinkage, but suffer in melt processability (i.e. thermal stability and flow), moisture adsorption and blistering resistance.

As further stated in U.S. Pat. No. 6,140,459, apart from the above semi-aromatic polyamides, for many E/E connector applications polyamide 46, PPS and LCP have been used. However, polyamide 46 is moisture sensitive, due to which blistering can be observed under reflow soldering process conditions. PPS tends to cause corrosion problems and part failure because of its brittleness. LCP can offer better performance than other materials but its weld line strength is low and price is high.

The solution provided by U.S. Pat. No. 6,140,459 is a flame retardant polymer composition comprising a flame retardant system, optionally inorganic fillers and a semi-crystalline, semi-aromatic nylon copolymer made from terephthalic acid (TA), aliphatic dicarboxylic acid having 9-12 carbon atoms and hexamethylene diamine (HMD), wherein the polymer has a glass transition temperature (Tg) of less than or equal to 90° C. and a melt temperature (Tm) of at least 295° C. These products are claimed to offer low post-moulding shrinkage, good melt stability and processability, low moisture adsorption and excellent blistering resistance under SMT (surface mount technology) IR melt reflow soldering conditions required for electronic connectors.

In view of the various trends of even higher peak temperatures involved in the mounting, increasing importance of safety aspects in terms of eliminating potential fire hazards and miniaturization resulting in even smaller parts with more dimension precision, there is a need for more, and even better flame retardant materials showing good melt stability and processability, dimensional stability, good mechanical properties and excellent blistering resistance under SMT conditions. These materials should show extended blister resistance and extended solder capabilities. Other properties these materials should show are high flow properties to provide for long flow paths, thin parts, low voids, meanwhile maintaining good mechanical properties such a high stiffness and toughness. Furthermore, dimensional stability is required after demoulding, before and after soldering, and after environmental exposure to hot/humid conditions.

Therefore the aim is to provide a plastic housing for an electrical connector and a connector comprising the plastic housing and further a flame retardant polymer material that can be used in the connector that has a better performance in terms of blister resistance. Meanwhile the material should have a good balance in melt stability and processability, mechanical properties and dimensional stability, preferably the overall balance is also improved.

This aim has been achieved with the connector according to the invention and the plastic housing therein made of a reinforced polymer composition comprising a reinforcing agent and a semi-aromatic polyamide copolymer comprising units derived from dicarboxylic acids comprising terephthalic acid and diamines comprising aliphatic diamines, wherein
   a. the dicarboxylic acids (A) consist of a mixture of 5-65 mole % aliphatic dicarboxylic acid and optionally aromatic dicarboxylic acid other than terephthalic acid (A1) and 35-95 mole % terephthalic acid (A2); and
   b. the aliphatic diamines (B) consist a mixture of 10-70 mole % of a short chain aliphatic diamine with 2-5 C atoms (B1) and 30-90 mole % of a long chain aliphatic diamine with at least 6 C atoms (B2);
   c. the combined molar amount of terephthalic acid (A2) and the long chain aliphatic diamine (B2) is at least 60 mole %, relative to the total molar amount of the dicarboxylic acids and diamines.

For compactness and readability, this semi-aromatic polyamide copolymer, will also be denoted herein as semi-aromatic polyamide X, or, even shorter, polyamide X.

This aim has also been achieved with a reinforced flame retardant polymer composition, formulated with flame retardant additives and reinforcing agent, and comprising a the semi-aromatic polyamide wherein the semi-aromatic polyamide is the same as described here above for the connector.

For the purposes of the present invention, an electrical or electronic connector, including a housing or enveloping material thereof, means a conductive device for joining electrical or electronic circuits together. The connection may be temporary, as for portable equipment, or may require a tool for assembly and removal, or may be a permanent electrical joint between two wires or devices.

In a preferred embodiment of the invention, the plastic housing of the connector is made of the flame retardant polymer composition mentioned here above.

The plastic connector housing according to the invention made of the said reinforced polymer composition displays superior resistance to blistering under reflow soldering conditions used in surface mounting techniques (SMT) for electronic connectors, as well as good processability and a very good balance of mechanical performance, shrinkage behaviour and dimensional stability.

The E/E connectors of the present invention have been found to have improved blister resistance over other polyamide compositions, including PA46, PA6T/66 and PA9T compositions. This was unexpected, especially given that the water absorption or uptake of the E/E connectors of the present invention was substantially higher than conventional polyamide E/E connectors with, what was seen as "good blister resistance", such as PA 9T.

In addition to the trend towards lead-free soldering processes, there is a trend towards further miniaturisation of E/E connectors. This trend has lead to a need for thin walled designs which do not warp and are able to have good mechanical properties, such as stiffness, at high temperatures. The E/E connector of the present invention are able to provide a combination of improved resistance to warping and improved stiffness at high temperatures compared to conventional polyamide compositions suitable for use in E/E connectors. The combination of isotropic type behaviour, associated similar coefficients of linear thermal expansion in the direction parallel and normal to polymer flow, and improved stiffness at high temperature is surprising as improvements in mechanical properties, such as stiffness, are typically associated with anisotropic materials, in which enhanced performance has been derived from increased orientation of the material.

The reinforced polymer composition in the plastic connector housing according to the invention also shows a better flow and higher toughness than corresponding flame retardant compositions based on PA-6T/66. The new composition also shows a high modulus and a very good dimensional stability, not only below Tg, but also above Tg. This is in particular surprising in view of the facts that the high temperature semi-crystalline polyamide in the inventive composition has a relatively low crystallinity and moreover the neat polyamide itself has a relatively low modulus above Tg. The semi-crystalline polyamide comprised by the composition according to the invention also has a relative high Tg, several embodiments thereof have a Tg above 90° C., i.e. above the upper limit of 90° C. as of U.S. Pat. No. 6,140,459, while still having a very good dimensional stability. Some polymers have a Tg as high as that of 6T/DT, which polymer is mentioned in U.S. Pat. No. 6,140,459 to be unsuitable for use in electrical connectors, even when moulded at 150° C. mould temperature, because of its high glass transition temperature (Tg) and high post-moulding shrinkage. Improved blister performance compared to PA6T/66 and PA46 and good dimensional stability results were also obtained when the semi-crystalline semi-aromatic polyamide comprised 1,4-diaminobutane as the short chain diamine in combination with for example hexane diamine as the long chain diamine, and terephthalic acid and adipic acid as the carboxylic acids, thus representing a PA6T/66/46 copolymer. Meanwhile the other good properties of the inventive compositions were maintained. This result is in particular surprising in view of the fact that polyamide 46 is highly moisture sensitive, its mouldings tend to be dimensionally unstable and blistering is frequently observed under reflow soldering process conditions, as reported in U.S. Pat. No. 6,140,459.

The reinforced flame retardant polyamide composition according to the second embodiment of the invention not only exhibits the above mentioned properties of the reinforced polymer composition, but also shows a high dielectric breakdown strength, even better than several other polyamide compositions.

It is noted that, where applicable, the improvements are based on comparison of polyamide compositions based on the semi-aromatic polyamide X, respectively copolyamides according to the cited prior art, such as polyamide 6T/66, wherein polyamide X and the said copolyamides were formulated to have a similar melting temperature.

The semi-aromatic polyamide X comprised by the plastic connector housing and by the reinforced flame retardant polyamide composition according to the invention, comprises units derived from aliphatic diamines and dicarboxylic acids. The units derived from the dicarboxylic acids can be denoted as A-A units and the units derived from the diamines can be denoted as B-B units. In line therewith the polyamides can be denoted as AABB polymers, corresponding with the classification applied in for example, Nylon Plastic handbook, Ed. M. I. Kohan, Hanser Publishers, Munich, ISBN 1-56990-189-9 (1995), page 5.

The short chain aliphatic diamine (B1) is a C2-C5 aliphatic diamine, or a mixture thereof. In other words it has 2-5 carbon (C) atoms. The short chain aliphatic diamine may be, for example, 1,2-ethylene diamine, 1,3-propanediamine, 1,4-butanediamine and 1,5-pentane diamine, and mixtures thereof. Preferably, the short chain aliphatic diamine is chosen from the group consisting of 1,4-butanediamine, 1,5-pentane diamine and mixtures thereof, more preferably 1,4-butanediamine.

The long chain aliphatic diamine (B2) is an aliphatic diamine with at least 6 carbon (C) atoms. The long chain aliphatic diamine may be linear, branched and/or alicyclic. The long chain aliphatic diamine may be, for example, 2-methyl-1,5-pentanediamine (also known as 2-methylpentamethylene diamine), 1,5-hexanediamine, 1,6-hexane diamine, 1,4-cyclohexanediamine, 1,8-octanediamine, 2-methyl-1,8-octanediamine, 1,9-nonanediamine, trimethylhexamethylene diamine, 1,10-decane diamine, 1,11-undecanediamine, 1,12-dodecanediamine, m-xylylenediamine and p-xylylenediamine, and any mixture thereof. Preferably, the long chain aliphatic diamine has 6-12 carbon atoms, and suitably is a C8- or C10 diamine. In a preferred embodiment, the long chain diamine consists for 50-100 mole %, more preferably 75-100 mole % of a diamine having 6 to 9 carbon atoms. This results in materials that have the even better high temperature properties. More preferably, the long chain aliphatic diamine is chosen from the group consisting of 1,6-hexane diamine, 2-methyl-1,8-octanediamine, 1,9-nonanediamine, and mixtures thereof, more preferably 1,6-hexane diamine. The advantage of this preferred choice, and in particular of the more preferred choice of 1,6-hexane diamine is that the high temperature properties of the copolyamide according to the invention are even better.

The aliphatic dicarboxylic acid may be straight chain, branched chain and/or alicyclic, and the number of carbon atoms therein is not specifically restricted. However, the aliphatic dicarboxylic acid preferably comprises a straight chain or branched chain aliphatic dicarboxylic acid with 4 to 25 carbon atoms, or a mixture thereof, more preferably 6-18 and still more preferably 6-12 carbon atoms. Suitable aliphatic dicarboxylic acid are, for example, adipic acid (C6), 1,4-cyclohexane dicarboxylic acid (C8), suberic acid (C8), sebacic acid (C10), dodecanoic acid (C12) or a mixture thereof. Preferably, the aliphatic dicarboxylic acid is a C6-C10 aliphatic dicarboxylic acid, including adipic acid, sebacic acid or a mixture thereof, and more the aliphatic dicarboxylic acid is a C6-C8 aliphatic dicarboxylic acid. Most preferably the aliphatic dicarboxylic acid is adipic acid.

The aromatic dicarboxylic acid may comprise, next to terephthalic acid, other aromatic dicarboxylic acids, for example isophthalic acid and/or naphthalane dicarboxylic acid.

The semi-aromatic polyamide may suitably comprises, next to terephthalic acid, aliphatic dicarboxylic acids and optionally aromatic dicarboxylic acids other than terephthalic acid, as well as any combination thereof. Preferably, the amount of the aromatic dicarboxylic acid other than terephthalic acid is less than 50 mole %, more preferably less than 25 mole %, relative to the total molar amount of aliphatic dicarboxylic acid and aromatic dicarboxylic acids other than terephthalic acid (A1).

In the semi-aromatic polyamide in the composition according to the invention, the short chain aliphatic diamine (B1) makes up for 10-70 mole % and the long chain aliphatic diamine (B2) makes up for the remaining 30-90 mole % of the aliphatic diamine units (B).

Preferably, the molar amount of the short chain aliphatic diamine is at most 60 mole %, more preferably 50 mole %, 40 mole %, or even 35 mole % relative to the molar amount of short chain and long chain diamines. An advantage of the copolyamide with such a lower molar amount of the short chain diamine is that for the copolyamide with a given Tm the blistering behaviour improves.

Also preferably, the molar amount of the short chain aliphatic diamine in the semi-aromatic polyamide is at least 15 mole %, more preferably, at least 20 mole %, relative to the total molar amount of short chain aliphatic diamine and long chain aliphatic diamine. The higher the molar amount of the short chain aliphatic diamine the better is the thermal stability of the polyamide.

The aliphatic dicarboxylic acid and aromatic dicarboxylic acids other than terephthalic acid (A1) make up for 5-65 mole % and the terephthalic acid (A2) makes up for the remaining 35-95 mole % of the dicarboxylic acid units (A).

Preferably, the dicarboxylic acids consist for at least 40 mole %, more preferably at least 45 mole %, or even at least 50 mole %, of terephthalic acid. The advantage of an increased amount of terephthalic acid is that the high temperature properties are further improved. Also preferably the amount of the aliphatic dicarboxylic acid and optionally aromatic dicarboxylic acids other than terephthalic acid (A1) is at least 10 mole %, more preferably at least 15 mole % of the dicarboxylic acid. This higher amount has the advantage that the composition has a better processability.

In a highly preferably embodiment, the dicarboxylic acids (A) consist of 50-85 mole % of terephthalic acids (A2) and 50-15 mole % of aliphatic dicarboxylic acid and optionally aromatic dicarboxylic acids other than terephthalic acid (A1), relative to the molar amount of dicarboxylic acids, the amount of the aromatic dicarboxylic acid other than terephthalic acid therein, if present at all, being less than 25 mole %, relative to the total molar amount of aliphatic dicarboxylic acid and aromatic dicarboxylic acids other than terephthalic acid (A1), and the aliphatic diamines (B) consist of 40-80 mole % long chain diamines (B2) and 60-20 mole % short chain diamines (B1), relative to the total molar amount of aliphatic diamines. This preferred composition gives a better overall balance in blistering properties, dielectric breakdown strength, processing behaviour and mechanical properties.

Whereas the minimum amount for the long chain aliphatic diamine is 30 mole %, relative to the total molar amount of aliphatic diamines, and the minimum amount for the terephthalic acid is 35 mole %, relative to the molar amount of dicarboxylic acids, the combined molar amount of the terephthalic acid and the long chain aliphatic diamine is at least 60 mole %, relative to the total molar amount of the dicarboxylic acids and diamines. The consequence thereof is that when the relative amount of the long chain aliphatic diamine is the minimal 30 mole %, the relative amount of terephthalic acid is at least 90 mole %. Analogously, when the relative amount of terephthalic acid is the minimal 35 mole %, the relative amount of the long chain aliphatic diamine is at least 85 mole %.

In another highly preferably embodiment, the sum of the molar amount of terephthalic acid (A2) and the long chain aliphatic diamine (B2) is at least 65 mole %, more preferably at least 70 mole % and still more preferably at least 75 mole %, relative to the total molar amount of dicarboxylic acids and diamines. The advantage of the polyamide with the sum of the molar amount of terephthalic acid (A2) and the long chain aliphatic diamine (B2) being higher is that the polyamide combines higher dielectric breakdown values with a better thermal stability and good melt processability. Suitably, the said sum is in the range of 70-85 mole %, or even 75-80 mole %, relative to the total molar amount of dicarboxylic acids and diamines.

Next to the A-A-B-B units derived from dicarboxylic acids (AA) and diamines (BB), the polyamide according to the invention may comprise units derived from other components, such as aliphatic aminocarboxylic acids (AB units) and the corresponding cyclic lactams, as well as small amounts of a branching agent and/or chain stoppers.

Preferably, the polyamide according to the invention comprises at most 10 mass %, more preferably at most 8 mass %, and still more preferably at most 5 mass %, relative to the total mass of the polyamide, of units derived from components other than dicarboxylic acids and diamines. Most preferably the polyamide according to the invention does not comprise such other components at all and consists only of A-A-B-B units derived from dicarboxylic acids and diamines. The advantage is a logistically simpler process and better crystalline properties.

Preferably, the semi-aromatic polyamide has a glass transition temperature (Tg) of more than 100° C., more preferably at least 110° C., or even at least 120° C. Preferably the Tg is at most 140° C., more preferably at most 130° C. Also preferably, the semi-aromatic polyamide has a melt temperature (Tm) of at least 295° C., preferably at least 300° C., more preferably at least 310° C. Preferably the Tm is at most 340° C., more preferably at most 330° C. A higher Tm results in better blistering resistance. A further advantage of the Tg and Tm being within these limits is a better balance in blistering resistance, dimensional stability and processing behaviour.

The measurement of the Tg and Tm herein is done by DSC, using the following methods. With the term melting point (temperature) is herein understood the temperature, measured according to ASTM D3417-97/D3418-97 by DSC with a heating rate of 10° C./min, falling in the melting range and showing the highest melting rate. With the term glass transition point is herein understood the temperature, measured according to ASTM E 1356-91 by DSC with a heating rate of 10° C./minute and determined as the temperature at the peak of the first derivative (with respect of time) of the parent thermal curve corresponding with the inflection point of the parent thermal curve.

The said semi-aromatic polyamide may have a viscosity varying over a wide range. Surprisingly it has been observed that the said semi-aromatic polyamide may have a relative viscosity may be as low as 1.6 or even lower while still retaining and blister resistance and good mechanical properties even for the reinforced flame retardant composition comprising both reinforcing agent and flame retardant. Normally, polyamides, and in particular semi-aromatic polyamide with such low molecular weight suffer from being very brittle, which property is enhanced when filler materials and flame retardants are comprised. The reinforced flame retardant composition according to the invention shows improved toughness, in comparison with corresponding compositions comprising a semi-aromatic polyamide according to the cited prior art.

Preferably the relative viscosity is at least 1.7, more preferably 1.8 or even 1.9. Retention of mechanical properties is really important for such moulded parts, which is still the case at such a low relative viscosity. Also preferably the relative viscosity is less than 4.0, more preferably less than 3.5 and still more preferably less than 3.0. This lower has relative viscosity the advantage that the flow during moulding is better and moulded parts with thinner elements can be made. It is noted that the values for the relative viscosity relate to the relative viscosity measured in 96% sulphuric acid according to method to ISO 307, fourth edition.

The said semi-aromatic polyamide may also consist of a blend of a semi-aromatic polyamide with a high relative viscosity and one with a low relative viscosity. Suitably, the blend comprises a component with a relative viscosity of at least 1.8, more preferably at least 1.9 and one component with a relative viscosity is of less than 1.7, more preferably less than 1.6. The first component with the relative viscosity of at least 1.9 can have a molecular weight of at least 10,000, while the second component with the relative viscosity of less than 1.6 can have a molecular weight of less than 7,500, preferably less than 5,000. The first and second component may be present in a weight ratio varying over a large range, and preferably in the range of 19:1-1:1, more preferably 9:1-3:1. The advantage of the presence of the second component with the relative low viscosity is that the moulding behaviour of the polyamide composition is further improved allowing moulding of parts with even thinner wall sections.

The reinforced polymer composition of which the inventive connector housing can be made may comprise the semi-aromatic polyamide X in an amount varying over a wide range. Suitably the amount of the semi-aromatic polyamide is in the range of 25-95 wt. %, more preferably the composition comprises 35-90 wt. %, or even 45-85 wt. %, relative to the total weight of the reinforced polymer composition. In the flame retardant polyamide composition according to the invention, the semi-aromatic polyamide may also be present in an amount varying over a wide range. Due to the flame retardant also being comprised, the relative amount which will generally be lower. Suitably the amount the semi-aromatic polyamide X therein is in the range of 25-80 wt. %, more preferably the composition comprises 25-60 wt. %, or even 30-50 wt. % of the semi-aromatic polyamide.

The connector housing and the composition according to the invention may comprise one or more other components, next to the semi-crystalline semi-aromatic polyamide and the reinforcing agent, and the optional flame retardant system. The flame retardant system may comprise a polymeric flame retardant. The other components may comprise polymers or polymeric components other than the high temperature semi-crystalline semi-aromatic polyamide and the optionally polymeric flamer retardant. These other polymers may comprise, for example, rubbers and thermoplastic polymers. Rubbers suitably include impact modifiers. The thermoplastic polymers may be other polyamides. Preferably, the polyamide is a semi-crystalline polyamide having a melting temperature which is lower than the melting temperature of high temperature semi-crystalline semi-aromatic polyamide.

The other polymer is preferably present in an amount of less than 25 wt. %, more preferably, if present at all, in an amount of 1-20 wt. %, still more preferably 2-15 wt. %, and most preferably 5-10 wt. %, relative to the total weight of the composition.

The advantage of a lower content of other polymers, and in particular absence of polymers like polyamide-46 and polyamide-6T/66, is that the dielectric strength is better retained, for example after exposure to environmental conditions at higher temperature and high humidity.

The flame retardant system may comprise a halogenated flame retardant and/or a halogen free flame retardant, and next to the said flame retardant or combination thereof optionally also a flame retardant synergist. The halogenated flame retardant may be a brominated polymer, for example a brominated polystyrene, a polybromostyrene copolymer, a brominated epoxy resin and/or a brominated polyphenylene oxide. Suitably, the halogenated flame retardant is a brominated polystyrene with a high bromine content, for example in the range of 61-70 wt. %. The higher bromine content allows lower loadings of flame retardant, and for better flow properties. The halogen free flame retardant may suitably be a nitrogen containing flame retardant, a phosphorous containing flame retardant and/or a nitrogen and phosphorous containing flame retardant. Suitable halogen free flame retardants are for example phosphates, in particular polyphosphates, such as melamine polyphosphates, and phosphinates, in particular metal salts of organic phosphinates, such as calcium—and aluminium diethylphosphinate. Examples of suitable synergists are antimony compounds like antimony trioxide, antimony pentoxide, and sodium antimonite, and other metal oxide, and zinc borate and other metal borates. Preferably, the synergist is zinc borate, since this provides improved blister resistance.

Suitably, the flame retardant system is present in a total amount of 1-40 wt. %, preferably 5-35 wt. %, relative to the total weight of the composition. Preferably the flame retardant is present in an amount of 5-30 wt. %, more preferably 10-25 wt. %, and the synergist is preferably present in an amount of 0-15 wt. %, more preferably 1-10 wt. %, and still more preferably 5-10 wt. %, relative to the total weight of the composition.

The reinforcing agent may comprise different fibrous materials, including glass fibres and carbon fibres, of which glass fibres are preferred. Suitably the reinforcing agent is present in an amount of 5-50 wt. %, preferably 15-45 wt. %, more preferably 25-40 wt. % relative to the total weight of the composition. As mentioned before the reinforcing agent has a strong increasing effect on the modulus of the composition above Tg, which increase is larger than in several other polyamides. This allows limitation of the amount of the reinforcing agent while still reaching very good mechanical properties. At low levels of reinforcing agent, limitation of the reinforcing agent also allows limiting the amount of flame retardant to reach a certain flame retardancy level. This is in particular the case with halogen free flame retardants. The overall effect is that good flame retardancy properties are obtainable with amounts comparable to other semi-aromatic polyamides, but much lower than needed for, for example, polyamide 4,6, even though the semi-crystalline polyamide in the inventive composition comprises AABB units based on short chain aliphatic diamine and aliphatic carboxylic acids such as in polyamide 4,6. A further advantage is that the flow properties of these compositions are much better than corresponding compositions with similar mechanical properties based on for example polyamide 6T/66.

Other additives that may be comprised by the inventive composition include inorganic fillers and auxiliary additives used in injection moulding compounds. The inorganic fillers are for example, glass flakes and mineral filler such as clay, kaoline, wollastonite, and talc, and other minerals, and any combination thereof. The amount of inorganic fillers may be varied over a large range, but suitably is in the range of 0-25 wt. %, relative to the total weight of the composition.

With auxiliary additives are understood those additives known by the person skilled in the art of making polyamide moulding composition usually comprised in the said polyamide compositions. Suitable auxiliary additives are, for example, stabilisers, such as UV stabilizers, heat stabilizers and antioxidants, colorants, processing aids, for example mould release agents and lubricants, flow improving additives, such as polyamide oligomers, and agents for improving the impact resistance. The amount of auxiliary additives may vary over a large range, but suitably is in the range of 0-10 wt. %, preferably 0.1-5 wt. % relative to the total weight of the composition.

In a preferred embodiment of the invention, the connector housing is made of a polymer composition consisting of
25-85 wt. % of the semi-aromatic polyamide X,
5-50 wt. % of the reinforcing agent, and
at least one component selected from the following group in the indicated amounts:
at most 50 wt. % of a flame retardant system,
at most 25 wt. % of polymers other than the semi-aromatic polyamide and polymeric flame retardant,
at most 25 wt. % of inorganic fillers, and/or
at most 10 wt. % other additives,
wherein the weight percentages (wt. %) are relative to the total weight of the composition.

In a more preferred embodiment of the invention, the polymer composition is a flame retardant composition consisting of:
25-80 wt. % of the semi-aromatic polyamide,
5-50 wt. % of the reinforcing agent, and
1-40 wt. % the flame retardant system, and
0-25 wt. % polymers other than the semi-aromatic polyamide and polymeric flame retardant,
0-25 wt. % inorganic fillers, and/or
0-5 wt. % auxiliary additives,
wherein the weight percentages (wt. %) are relative to the total weight of the composition.

The other polymers, inorganic fillers and auxiliary additives herein are optional components, meaning that either none or only one of them or a combination of only two or all three may be present. Suitably, at least one or more auxiliary additives are present.

More preferably, the composition consists of
30-60 wt. % of the semi-aromatic polyamide,
15-45 wt. % of the reinforcing agent, and
5-35 wt. % the flame retardant system,
0.1-5 wt. % auxiliary additives, and
0-25 wt. % polymers other than the semi-aromatic polyamide and polymeric flame retardant, and
0-25 wt. % inorganic fillers.

The copolyamide according to the invention can be prepared in various ways known per se for the preparation of polyamides and copolymers thereof. Examples of suitable processes are for example described in Polyamide, Kunststoff Handbuch ¾, Hanser Verlag (Müunchen), 1998, ISBN 3-446-16486-3. The flame retardant compositions comprising the copolyamide, the flame retardant system and the reinforcing agent, and one or more additives can also be made by standard compounding techniques known by the person skilled in the art, for example in a twin screw extruder.

The polymer compositions for the connector according to the invention described herein can be moulded into plastic parts for use in surface mounted electric/electronic devices, which parts offer better blistering resistance under more severe soldering process conditions.

The moulding may be accomplished by injection moulding techniques known to the person skilled in the art of injection moulding of plastics. The good mouldability of the compositions comprising semi-aromatic polyamide X favour such processes. For the measurement of the mouldability, a Barflow method or a spiral flow method can be applied, wherein the polymer composition is injection moulded at a specified melt temperature and injection pressure, e.g. 80 MPa, 90 MPa and/or 100 MPa, into a cavity with specified width and thickness and the length of an injection moulded specimen is determined. The difference between the test methods is that in the first case the specimen is linear while in the second case it has a spiral like shape. The retention of the good mouldability of the flame retardant compositions according to the invention has been demonstrated in a spiral flow test. For the making the connector housings according to the invention, the polymer composition comprising semi-aromatic polyamide X may have a spiral flow length varying over a wide range at temperature slightly above the melt temperature of semi-aromatic polyamide X. Due to the high temperature stability of the said composition, the set-temperature of the injection moulding apparatus and the resulting temperature of the melt may be raised substantially enough to further reduce the spiral flow length without significant degradation of the polyamide. Preferably however, the polymer composition has a spiral flow length, determined on spiral cavity with dimensions 280×15×1 mm at a temperature 10° C. above the melt temperature of semi-aromatic polyamide X at 80 MPa effective injection pressure, of at least 100 mm, more preferably at least 120 mm, and still more preferably at least 133 mm.

The invention also relates to a plastic housing for an electrical connector. In a preferred embodiment the plastic housing comprises a flame retardant polyamide composition as described above. The invention also relates to an electrical connector for joining electrical circuits together in electrical or electronic applications, comprising a conductive element and a plastic housing embedding at least part of the conductive element and wherein the plastic housing comprises a flame retardant polyamide composition according to any of the above mentioned claims.

The electrical connector may be, for example, an I/O connector, a card connector, such as a PCB connector, an FPC (flat printed circuit) connector or an FFC (flat flexible cable) connector, a high speed connector, a terminal block style, an MID (moulded integrated device) connector, a plug and socket connector, a test socket, or any combination thereof. For example printed circuit board (PCB) mounted terminal blocks are soldered to the board, but they are available in a pull-apart versions that allow the wire-connecting half of the block to be unplugged from the part that is soldered to the PCB.

The housing for an electrical connector according to the invention, and the corresponding electrical connector offer enhanced properties, which can be advantageously be used in the various applications of connectors. For I/O connectors, the advantages are reduced blistering, increased stiffness at low loads of flame retardant and/or fibre reinforcement.

The I/O connector may, for example, be a connector for a battery connector device, for mobile equipment, such as mobile phones or for office equipment. These applications generally involve SMT (surface mounting technology) mounting processes comprising a soldering step. The housings according to the invention show a very good dimensional stability during soldering processes. In this application, the mechanical properties are becoming more critical due to downsizing of connectors (smaller pitches and form factors) (peel off strength on PCB, high pre loads on contacts, heavy environmental testing (High humidity thermal shock). The I/O connectors according to the present invention based on the flame retardant as well as on the non-flame retardant compositions perform well in these aspects The I/O connector may also be an connector used in automotive, i.e. a connector used in electrical and electronic automotive systems (e.g. ECU headers, sealed connectors, ABS modules). The housings according to the invention offer low moisture absorption and dimensional stability, low warpage and good mechanical properties (also at high temperatures), good chemical resistance and can be laser welded, all properties required for autoconnector applications.

For card connectors, miniaturizing results in even higher mechanical forces during assembly and in use, and requires better flowing materials while being stronger and showing less warpage. The housings according to the invention show, and a better flow than corresponding compositions based on Polyamide-6,6 even less warpage than Polyamide-46, while still showing very good mechanical properties. In these applications high preloads are applied to the contacts (due to reduced heights) which results in high mechanical loads on the housing. This is critical during reflow soldering. LCP is used for a long time in these applications but becomes critical in reduced thicknesses. The connector according to the present invention keeps high stiffness at high temperatures (SMT temperatures).

The card connector suitably is a PCB connector, an FPC (flat printed circuit) connector or a FFC (flat flexible cable) connector. In particular for FPC and FFC connectors, a good flow, high stiffness, low moisture absorption and good dimensional stability are critical parameters, which properties are well balanced in the plastic housing according to the invention.

The plastic housing according to the invention also shows a very stable dielectric profile, with a very low dielectric response and low dielectric constant at room temperature as well as at a broad temperature range there above, even at conditions with high humidity, and is performing better in that respect than corresponding semi-aromatic polyamides according to the prior art like polyamide 6T/66. This is an important advantage for high speed connectors. The high speed connector is, for example a high speed back plane connector (level 3 connectors) or an hdmi/UDI/display port connectors (for High definition TV).

A further advantage of the housing and corresponding connectors according to the invention is a high CTI (comparative tracking index), and likewise a high dielectric strength, exhibited by the polyamide composition of which these housings are made, even when the composition comprises a flame retardant system. The CTI value thereof is much higher than for corresponding products made of, for example, Polyamide 66/6T. The high CTI values make the connectors highly suitable for high voltage applications, in particular for terminal blocks, and connectors used in railway applications (high voltage) and also allow further reduction of the dimensions of the connectors, as required by the ongoing miniaturization. Typically the CTI values above 400 V, complying with Class I according to UL 746-A. When formulated with regular glass fibres as reinforcement agents and regular flame retardants, including halogen free flame retardants based on melamine and/or phosphates derivatives, for example melamine polyphosphates, and metal salts of phosphinates, and halogen containing flame retardant systems based on halogen containing polymers like polybromostyrene, and flame retardant synergists, like zinc borate, and leaving out, or limiting additives that reduce the CTI, CTI values of 600 V and above can be reached, thus complying with Class 0 according to UL 746-A. Selection of additives that are neutral in respect of the CTI or have a positive effect on the CTI, and avoiding or limiting the amount of additives that have a negative effect on the CTI, can be selected by the person, skilled in the art of making injection moulding products complying with CTI requirements in general and UL regulations in particular, on the basis of general knowledge and routine experiments. The high CTI values, in combination with the good mechanical properties and low warpage, can advantageously be used in industrial high voltage terminal blocks. Preferably, the CTI of the housing and the flame retardant material according to the invention used herein have a CTI, of at least 500 V, more preferably at least 600 V.

The invention further relates to use of the said electrical connector mentioned here above in an SMT process comprising a reflow soldering step, and to an electrical or electronic device comprising the electrical connector mounted by an SMT process comprising a soldering step. Rather than a reflow soldering step, the process may comprising a similar mounting step involving a heating step. In the heating step, the peak temperature can be rather high due to the blister properties of the polymer composition comprising semi-aromatic polyamide X. The temperature may be as high as 250° C. and higher, and suitably is in the range of 260° C.-300° C., preferably 270° C.-280° C. With very short thermal loads, i.e. very short duration of the exposure to the peak temperature, the peak temperature may be even higher than 300° C.

There are several soldering methods available currently. They include vapour phase soldering, wave soldering, dip soldering, IR reflow soldering, and conventional hot air reflow soldering. Flame retardant compositions of the semi-aromatic polyamide claimed in this application provide superior soldering resistance as expected from the blister results of the tests shown in the Tables below. The above mentioned soldering processes offer a highly productive method for surface mounted devices on electronic circuit boards. The mounting step in these processes, which all involve a heating step, can generally be grouped as processes involving a thermal soldering step.

The invention is illustrated with the following examples and comparative experiments.

EXPERIMENTAL

The polyamide compositions used in the preparations of the E/E connectors were prepared by first preparing the polyamide polymer for Examples 1 to 5 (E-1 to E-5) and comparative examples (CE) A, B, C and F. Comparative examples D and E were commercial flame retardant, glass fiber reinforced polyamide compositions formulated for use in electrical devices such as switchgears.

Polymer Preparation

E-1 Polymer

PA-6T/4T/46 (Mole Ratio 67.5/21.3/11.2)

A mixture of 179.8 g tetramethylene diamine, 347.25 g hexamethylene diamine, 537 g water, 0.36 g sodium hypophosphite monohydrate, 72.36 g adipic acid and 653.38 g terephthalic acid was stirred in a 2.5 liter autoclave with heating and with the removal of water by distillation. It is noted that a slight excess of tetramethylene diamine of about 2-4 wt. % has been used, compared to the composition of the calculated polyamide composition, to compensate for the loss of tetramethylene diamine during the preparation of the polyamide. After about 27 minutes a 91 wt. % aqueous salt solution was obtained. In this process the temperature increased from 169° C. to 223° C. The polymerisation was effected at increasing temperatures of 210° C. to 226° C. for 21 minutes, during which the pressure rose to 1.3 MPa, after which the autoclave's contents were flashed and the solid product was cooled further under nitrogen. The prepolymer thus obtained was subsequently dried in a drying kiln for several hours heating at 125° C. under vacuum and a stream of nitrogen of 0.02 MPa. The dried prepolymer was post-condensed in the solid phase in a metal tube reactor (d=85 mm) for several hours heating at 200° C. under a stream of nitrogen (2400 g/h) and then under a stream of nitrogen/water vapour (3/1 weight ratio, 2400 g/h)) for 2 hours at 225° C. and 40 hours at 260° C. Then the polymer was cooled to room temperature.

E-2 Polymer

Preparation of PA-6T/4T/46 (Mole Ratio 74.5/10/15.5)

In the same way as for the E-1 Polymer a mixture of 127.09 g tetramethylene diamine, 350.05 g hexamethylene diamine, 487 g water, 0.66 g sodium hypophosphite monohydrate, 91.59 g adipic acid and 567.48 g terephthalic acid was stirred in a 2.5 liter autoclave with heating so-that an 91 wt. % aqueous salt solution was obtained after 22 minutes. In this process the temperature increased from 176° C. to 212° C. The polymerisation was effected at increasing temperatures of 220° C. to 226° C. for 22 minutes, during which the pressure rose to 1.4 MPa. The prepolymer thus obtained was subsequently dried in a drying kiln for several hours heating at 125° C. and 180° C. under vacuum and a stream of nitrogen of 0.02 Mpa. The prepolymer was post-condensed in the solid phase in a metal tube reactor (d=85 mm) for several hours heating at 190° C. and 230° C. under a stream of nitrogen (2400 g/h) and then under a stream of nitrogen/water vapour (3/1 weight ratio, 2400 g/h) for 96 hours at 251° C. Then the polymer was cooled to room temperature.

E-3 Polymer

Preparation of PA-6T/56 (Mole Ratio 85/15)
Equivalent to PA-6T/5T/66 (Mole Ratio 70/15/15)

A mixture of 55.3 g of pentamethylene diamine (98 wt. %), 529.7 g aqueous hexamethylene diamine (59.6 wt. %), 360.4 g water, 0.5 g sodium hypophosphite monohydrate, 67.2 g adipic acid and 433.04 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 15 min, during which the pressure rose to 2.9 MPa, after which the autoclave's contents were flashed and the solid product was cooled further under nitrogen. The prepolymer was post-condensed in the solid phase in a metal tube reactor (d=85 mm) for several hours heating at 200° C. under a stream of nitrogen (2400 g/h) and then under a stream of nitrogen/water vapour (3/1 weight ratio, 2400 g/h)) for 2 hours at 230° C. and 24 hours at 260° C. Then the polymer was cooled to room temperature.

E-4 Polymer

Preparation of PA-6T/5T/56 (Mole Ratio 75.5/15/9.5)

A mixture of 78.4 g of pentamethylene diamine (98 wt. %), 473.3 g aqueous hexamethylene diamine (59.6 wt. %), 382.56 g water, 0.5 g sodium hypophosphite monohydrate, 42.6 g adipic acid and 461.5 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 15 min, during which the pressure rose to 2.8 MPa, after which the autoclave's contents were flashed and the solid product was cooled further under nitrogen. The prepolymer was subsequently dried and post-condensed in the solid phase in the same way as the E-1 polymer. Then the polymer was cooled to room temperature.

E-5 Polymer

Preparation of PA-6T/66/56 (Mole Ratio 76.5/12/11.5)

A mixture of 36.9 g of pentamethylene diamine (98 wt. %), 553.0 g aqueous hexamethylene diamine (59.6 wt. %), 351.2 g water, 0.5 g sodium hypophosphite monohydrate, 105.8 g adipic acid and 391.4 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 20 min, during which the pressure rose to 2.8 MPa, after which the autoclave's contents were flashed and the solid product was cooled further under nitrogen. The prepolymer was subsequently dried and post-condensed in the solid phase in the same way as the E-1 polymer. Then the polymer was cooled to room temperature.

CE-A Polymer

PA6T/66 (Molar Ratio 60/40)

In the same way as for Polymer I a mixture of 520 g hexamethylene diamine, 537 g water, 0.36 g sodium hypophosphite monohydrate, 330 g adipic acid and 420 g terephthalic acid was stirred in a 2.5 liter autoclave with heating so-that an 91 wt. % aqueous salt solution was obtained after 27 minutes. In this process the temperature increased from 169° C. to 223° C. The polymerisation was effected at increasing temperatures of 210° C. to 226° C. for 21 minutes, during which the pressure rose to 1.3 MPa. The prepolymer was subsequently dried and post-condensed in the solid phase in the same way as the E-1 Polymer. Then the polymer was cooled to room temperature.

CE-B, C Polymer

PA 46

In the same way as for Polymer I a mixture of 430.4 g tetramethylene diamine, 500 g water, 0.33 g sodium hypophosphite monohydrate and 686.8 g adipic acid was stirred in a 2.5 liter autoclave with heating so-that a 90 wt. % aqueous salt solution was obtained after 25 minutes. In this process the temperature increased from 110° C. to 162° C. The polymerisation was effected at increasing temperatures of 162° C. to 204° C. in during which the pressure rose to 1.3 MPa. The prepolymer was subsequently dried and post-condensed in the solid phase in the same way as for the E-1 polymer. Then the polymer was cooled to room temperature.

Comparative Example CE-F

Preparation of PA-6T/5T (Mole Ratio 56/44)

A mixture of 201.4 g of pentamethylene diamine, 300.8 g hexamethylene diamine, 521.1 g water, 0.65 g sodium hypophosphite monohydrate and 722.18 g terephthalic acid was stirred in a 2.5 liter autoclave with heating and with distillative removal of water. After 27 minutes a 90 wt. % aqueous salt solution was obtained, while the temperature rose from 170° C. to 211° C. Then the autoclave was closed. The polymerisation was effected at increasing temperatures of 211° C. to 250° C. in 15 minutes. The mixture was stirred at 250° C. for 29 min, during which the pressure rose to 2.9 MPa, after which the autoclave's contents were flashed and the solid product was cooled further under nitrogen. The prepolymer was subsequently dried and post-condensed in the solid phase in the same way as for the E-3 polymer. Then the polymer was cooled to room temperature.

Compound Preparation

E-1 to E-5, CE-A to C and CE-F also included the following components:
  Standard glass fibre grades for polyamides;
  Flame retardant: brominated polystyrene (Saytex® HP3010 available from Albermarle);

Flame retardant synergist: zinc borate (Firebrake® 500 available from Luzenac); and Auxiliary additives comprising a release agent and a stabilizing package, Comparative Experiments D and E were based on commercial products: CE-D being Zytel HTNFR52G30BL, a PA6T/66 product from DuPont, and CE-E being Genestar GN2332 BK, a PA9T product from Kururay. Conventional analytical techniques were used to estimate the proportions of brominated polystyrene, sygnergists and auxiliary additives used in these commercial products. Analysis of the PA9T product from Genestar revealed that the polyamide component consisted of PA8T and PA9T in a molar ratio of approximately 20:80.

The compounds of E-1 to E-5, CE-A to C and CE-F were prepared on a Werner & Pfleiderer KSK 4042D extruder set on a 325° C. flat temperature. All components were dosed into the feed port of the extruder, except for the glass fibers that were dosed separately into the melt via a side feed port. The polymer melt was degassed into strands at the end of the extruder, cooled and chopped into granules. The compounded and commercial compositions are shown in Table 1.

Injection Moulding:

The materials described above were pre-dried prior to use in injection moulding, by applying the following conditions: the copolyamides were heated under vacuum of 0.02 Mpa to 80° C. and kept at that temperature and pressure for 24 hrs while a stream of nitrogen was passed. The pre-dried materials were injection moulded on an Arburg 5 injection moulding machine with a 22 mm screw diameter and a Campus UL 0.8 mm 2 body injection mould. The temperature of the cylinder wall was set at 345° C., and the temperature of the mould was set at 140° C. The Campus UL bars thus obtained were used for further tests.

preset temperature and humidity level, the weight increase was monitored over time until the saturation level was reached. The weight increase at saturation level was calculated as a percentage of the starting weight of the pre-dried sample.

Blistering Performance Under Reflow Soldering Conditions.

For the blistering performance under reflow soldering conditions a large number of pre-dried samples were conditioned in a humidifying cabinet at a preset temperature and humidity level in the same way as for water absorption test described above. At different time intervals individual samples (in lots of 10) were taken from the cabinet, shortly cooled at ambient conditions to room temperature, put in a reflow oven and subjected to temperature conditions as applied in reflow soldering processes. The temperature profile applied was the following. First the samples were preheated with a heating ramp of average 1.5° C./sec to reach a temperature of 140° C. after 80 seconds, after which the sample was heated more gradually to reach a temperature of 160° C. after 210 sec from the start. Then, the sample was heated to 260° C. with a initial heating ramp of about 6° C./sec to reach a temperature of 220° C. after 220 sec and a more gradual heating rate of 2° C./sec to reach a temperature of 260° C. after 290 sec from the start. After that, the sample was cooled down to 140° C. in 20 sec. Then the 10 samples were taken from the oven, let cool to room temperature and inspected for the presence of blisters. For each condition period in the humidifying cabinet the percentage of samples that showed occurrence of blistering was rated. The percentage of samples with blisters was recorded.

Coefficient of linear thermal expansion was determined in accordance with ISO 11359-1/-2.

Dielectric constant of the sample (DAM) was determined in accordance with IEC 60250 at a frequency of 3 Ghz at 23° C.

TABLE I

Compound compositions

|  | E-1 | E-2 | E-3 | E-4 | E-5 | CE-A | CE-B | CE-C | CE-D | CE-E | CE-F |
|---|---|---|---|---|---|---|---|---|---|---|---|
| Polymer % | 42 | 37 | 42 | 42 | 42 | 42 | 37 | 42 | 41 | 41 | 42 |
| Glass fibers | 30 | 40 | 30 | 30 | 30 | 30 | 40 | 30 | 30 | 33 | 30 |
| Brominated polystyrene | 20 | 16 | 20 | 20 | 20 | 20 | 16 | 20 | 24 | 20 | 20 |
| Synergist | 7 | 6 | 7 | 7 | 7 | 7 | 6 | 7 | 4 | 5 | 7 |
| Aux. additives | 1 | 1 | 1 | 1 | 1 | 1 | 1 | 1 | 1 | 1 | 1 |

Test Methods

Relative viscosity (RV) was determined in 1 mass % formic acid solution.

Spiral flow was determined on spiral cavity with dimensions 280×15×1 mm at a temperature 10° C. above the melt temperature of semi-aromatic polyamide X at 80 MPa effective injection pressure.

Thermal Characterization by DSC:

Melting point ($T_m$) and glass transition temperature ($T_g$) were determined with the aid of differential scanning calorimetry (DSC) (2nd run, 10° C./min.) according to ASTM D3417-97 E793-85/794-85.

E-modulus was determined in a tensile test at 23° C. and 5 mm/min, according to ISO 527.

Impact test (notched-Charpy) was determined at 23° C. according to ISO 179/1A.

Water/Humidity Absorption (Uptake) Tests:

Pre-dried samples (0.8 mm UL bars) were conditioned in a humidifying cabinet or a container of distilled water at a Dielectric strength of the sample (DAM) was determined in accordance with IEC 60243-1.

Comparative Tracking Index was determined in accordance with IEC 60112.

Heat Deflection Temperature was determined in accordance with ISO 75-1/-2 with a load of 1.8 MPa applied.

All compounds complied with UL-94-V0 for 0.8 mm test bars.

Results

The results of the experimentation are presented in Table 2.

As illustrated in Table 2, the compositions of the present invention overcome the problems associated with soldering E/E connectors with conventional polyamide compositions by providing a polyamide composition with improved blistering resistance, dimensional stability and mechanical properties at high temperatures, while at least retaining the required processing, electrical and flame retardant properties of conventional compositions.

The compositions of the present invention have been found to provide improved blister performance against polyamide compositions suitable for E/E connector applications. Compositions under the scope of the present invention were found to comply with the requirements of the JEDEC 2/2a blister test (IPC/JEDEC J-STD-020C July 2004). In contrast, none of the comparative examples were able to comply with this industry standard.

JEDEC level 2 is achieved if no blistering is observed after reflow soldering conditions after conditioning the samples for 168 hrs at 85° C. and 85% relative humidity.

JEDEC level 2a is achieved if no blistering is observed after reflow soldering conditions after conditioning the samples for 696 hrs at 30° C. and 60% relative humidity.

Of the comparative examples, CE-E which included a polyamide 9T based composition recorded the best blister performance, although still considerably lower than the compositions within the scope of the present invention. This finding is to be expected, based upon the lower moisture absorption of the CE-E. Indeed, the blister results within the comparative examples reveal a correlation between blister performance and moisture uptake levels.

The teaching that improved blistering performance is to be achieved through producing a more hydrophobic polyamide which absorbs less moisture is also present in U.S. Pat. No. 6,140,459 and WO2006/135841 which discloses improved blister performance in a polyamide composition comprising repeating units derived from dicarboxylic acid monomers comprising terephthalic acid and aliphatic diamines having 10 to 20 carbon atoms (eg. PA10T). Thus, it is surprising that the examples under the scope of the present invention have superior blister performance, compared to conventional polyamides, despite their relatively high water uptake.

For comparison purposes it is noted that in the cited art U.S. Pat. No. 6,140,459 the blistering was tested after 96 hrs conditioning at 40° C., 95% RH, and applying peak temperatures up to 250° C. In those tests PA 6T/66 already failed at 240° C. and PA 6T/D6 did not even pass 210° C.

In contrast to comparative examples, the compositions of the present invention exhibit isotropic behaviour, as illustrated by the lower variation in the coefficient of linear thermal expansion (CLTE) between normal and parallel directions of the polymer flow. This low variance results in components which are less prone to warp. This property is becoming increasingly important due to the trend towards a reduction in component wall thicknesses. Similar improvements were also observed in respect to mold shrinkage performance.

Likewise stiffness at high temperature, as measured by the temperature of deflection under load ($T_{def}$), is an increasing important parameter to enable thin wall components to mechanically withstand the high temperature environment encountered during the soldering process. The compositions of the present invention exhibit improved stiffness at high temperature, with component parts able to withstand loads to within 11° C. of their melting point compared to about a 20° C. difference between $T_m$ and $T_{def}$ of the PA 66/6T and PA 9T based compositions.

TABLE 2

Performance characteristics of E/E connectors polyamide compositions

| | E-1 | E-2 | E-3 | E-4 | E-5 | CE-A | CE-B | CE-C | CE-D | CE-E | CE-F |
|---|---|---|---|---|---|---|---|---|---|---|---|
| CLTE Parallel/Normal ($\times 10^{-5}$ $K^{-1}$) | 3.0/3.7 | 3.0/3.1 | | | | 2.2/5.8 | 2.5/5.0 | 2.5/5.4 | 2.1/6.0 | 3.0/4.0 | |
| CLTE Normal-Parallel ($\times 10^{-5}$ $K^{-1}$) | 0.7 | 0.1 | | | | 3.6 | 2.5 | 2.9 | 3.9 | 1.0 | |
| % Blister @ 12 hr 85° C./85% | 0 | 0 | | | | | | | 100 | 100 | |
| % Blister @ 48 hr 50° C./95% | 0 | 0 | | | | 100 | | | 100 | 20 | |
| % Blister @ 96 hr 85° C./60% | 0 | 0 | 0 | 20 | 30 | | 100 | 100 | 80 | 40 | 100 |
| % Blister @ 168 hr 85° C./60% | 0 | 20 | | | | | 100 | 100 | 100 | 100 | |
| % Blister @ 696 hr 30° C./60% | 0 | 0 | | | | 100 | 100 | | 80 | 80 | |
| H$_2$O uptake 50° C.95% (% wt.) | 2.9 | 2.5 | | | | 2.3 | 3.6 | 4.8 | 2.8 | 1.1 | |
| H$_2$O uptake (in H$_2$O) 23° C. (% wt.) | 3.8 | 3.3 | 4.0 | 4.8 | 5.3 | 3.2 | 4.5 | 5.5 | 3.3 | 1.0 | 5.5 |
| Melting temperature $T_m$ (° C.) | 318 | 320 | 320 | 311 | 313 | 313 | 295 | 295 | 305 | 305 | 312 |
| Glass transition temp. $T_g$ (° C.) | 134 | 135 | 126 | 120 | 110 | 100 | 75 | 75 | 90 | 125 | 142 |
| Temp. of deformation $T_{def.}$ (° C.) | 307 | 309 | 307 | 295 | 297 | 291 | 290 | 290 | 285 | 285 | 282 |
| $T_m - T_{def}$ (° C.) | 11 | 11 | 13 | 16 | 16 | 22 | 5 | 5 | 20 | 20 | 30 |
| Dielectric strength-DAM (kV/mm) | 33 | 33 | | | | 36 | 30 | 30 | 37 | 30 | |
| –70° C./62% RH (kV/mm) | 33 | 33 | | | | | 20 | 20 | | | |
| –23° C./100% RH (kV/mm) | 25 | 24 | | | | 4 | | 4 | | | |
| Dielectric constant 23° C. (3 GHz) | 3.4 | | | | | 3.7 | | 4.2 | 3.8 | 3.3 | |
| CTI (V) | 520 | 480 | | | | 520 | 320 | 220 | 520 | 400 | |
| RV pellets/UL bars | 1.95/1.87 | 1.95/1.91 | 2.0/— | | | 2.33/2.41 | | | 1.97/1.95 | | 3.2/— |
| E-mod (GPa) | 13.5 | 16.5 | | | | 13.0 | 12 | 15 | 12 | 13 | |
| Charpy Notched (KJ/m$^2$) | 14 | 17 | | | | 13 | 12 | 11 | 10 | 14 | |
| Spiral flow: 80 MPa (mm) | 153 | 135 | | | | 127 | 110 | 130 | 153 | 177 | |

The invention claimed is:

1. An electrical connector for joining electrical circuits together in electrical or electronic applications, comprising a conductive element and a plastic housing, wherein at least part of the conductive element is embedded in the housing, and wherein the plastic housing comprises a flame retardant polyamide composition which exhibits blister resistance when heated during a reflow soldering of the conductive element to a peak temperature in the range of 260° C. to 300° C., wherein the flame retardant polyamide composition consists of:
   25-80 wt. % of a semi-aromatic polyamide having a glass transition temperature (Tq) of at least 110° C. and at most 140° C. and a melt temperature (Tm) of at least 300° C. and at most 340° C.;
   5-50 wt. % of a reinforcing agent;
   1-40 wt. % of a flame retardant system comprising at least one flame retardant; and
   0-25 wt. % polymers other than the semi-aromatic polyamide,
   0-25 wt. % inorganic fillers, and/or
   0-5 wt. % auxiliary additives, wherein
   the weight percentages (wt. %) are relative to the total weight of the composition and wherein the semi-aromatic polyamide comprises units derived from aliphatic diamines and dicarboxylic acids, and wherein
a) the dicarboxylic acids (A) consist of a mixture of (A1) 5-65 mole % aliphatic dicarboxylic acid, less than 25 mole % aromatic dicarboxylic acids other than terephthalic acid, and (A2) 35-95 mole % terephthalic acid;
b) the aliphatic diamines (B) consist a mixture of (B1) 10-70 mole % of a short chain aliphatic diamine with 2-5 C atoms, and (B2) 30-90 mole % of a long chain aliphatic diamine with at least 6 C atoms; and
c) the combined molar amount of the terephthalic acid (A2) and the long chain aliphatic diamine (B2) is at least 60 mole %, relative to the total molar amount of the dicarboxylic acids and diamines.

2. The electrical connector according to claim 1, having a comparative tracking index (CTI) of at least 500 V.

3. The electrical connector according to claim 1, wherein the electrical connector is an I/O connector, a card (PCB) connector, an FPC (flexible printed circuit) connector, an FFC (flexible foil circuit) connector, a high speed connector, a terminal block, an MID (moulded integrated device) connector, or a plug and socket connector, or any combination thereof.

4. The electrical connector according to claim 1, wherein the aliphatic diamines (B) consist a mixture of (B1) a short chain aliphatic diamine with 4 or 5 C atoms, and (B2) a long chain aliphatic diamine having 6 C atoms.

5. An electrical or electronic device comprising the electrical connector according to claim 1, mounted by an SMT process comprising a thermal soldering step.

\* \* \* \* \*